Patented Dec. 25, 1945

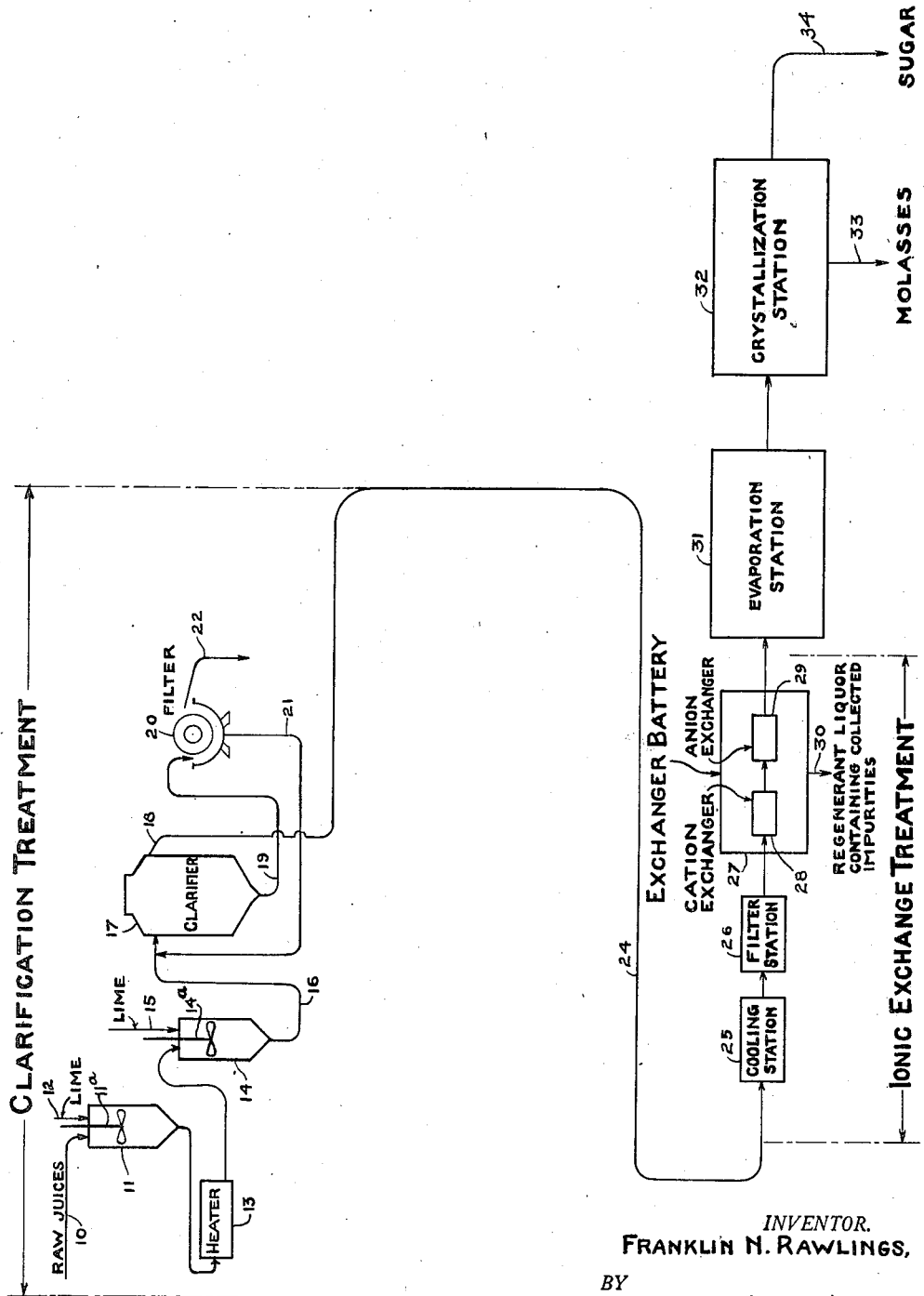

2,391,843

UNITED STATES PATENT OFFICE 2,391,843

PURIFICATION OF SUGAR SOLUTIONS

Franklin Nathan Rawlings, Westport, Conn., assignor to The Dorr Company, New York, N. Y., a corporation of Delaware Application November 7, 1941, Serial No. 418,111

1 Claim. (Cl. 127—46)

This invention relates to the purification of solutions from which sugar is to be extracted, by the removal therefrom of non-sucrose impurities the presence of which will prevent normal crystallizable sucrose from being crystallized thereby causing such sucrose to be lost in the molasses residue that results from the evaporation and crystallizing operations. More in particular this relates to improvements in methods for removing from the solution impurities which are removable by clarification treatment because they are coagulatable as well as dissolved non-sucrose matter that is non-coagulatable.

It is among the broad objects of this invention to remove by subtraction from sugar juice a maximum of impurities at maximum efficiency and economy with respect to operation, apparatus, and chemicals involved. Another object is to produce highly refined decolorized crystallized sugar at maximum economy.

The treatment methods to effect the removal of impurities from juices or solutions from which sugar is to be extracted, vary depending upon the particular and inherent character of the juice, and also upon the character and relative amounts of impurities contained in the juice.

Among such sugar juices or solutions are beet juice, cane juice, and possibly solutions from which corn sugar is made.

The impurities in these juices or solutions are classifiable as: (1) suspended impurities including colloids; (2) dissolved matter both naturally present and induced by usual treatment methods; and (3) coloring constituents.

This invention is based upon the concept that coagulatable and flocculatable impurities are separated from the juice by a treatment herein termed clarification treatment, while the dissolved impurities which are non-coagulatable and non-precipitable are removed by subsequent treatment with ionic exchangers, which treatment I have herein termed ionic purification treatment.

This invention proposes to correlate in a special manner clarification treatment of the juice, with ionic exchange treatment. The correlation of these treatment phases is such that disadvantages cancel out in the combination, while cumulative advantages emerge that produce an unexpected degree of total improvement because of a novel distribution of the total impurities removal burden realized throughout the process.

In such a combination treatment if practiced according to the invention, the clarification treatment phase can be conducted effectively and economically without the limiting compromise or critical requirements which have had to be accepted in the conventional clarification treatment of the juice.

The ionic exchange treatment as used on clarified juice is particularly described in my co-pending application Serial No. 376,717, filed January 3, 1941, where it has been termed organolite treatment because of the special type of exchangers proposed therein. Organolites are organic, resinous, cation and anion exchangers (which are capable of operating in the hydrogen-ion and hydroxyl-ion cycle respectively), and are to be distinguished from inorganic exchangers such as zeolites from which they differ basically in various respects as explained in my co-pending application.

In the co-pending application I have also shown that these organolites have the capacity of removing color as well as colloids from the juice. Colloids are suspended particles not recognizable under the ordinary microscope and of a size range that cannot be removed by conventional means of filtration. They are recognizable, however, with the aid of the so-called ultra microscope of more recent development which permits even of counting the number of colloids present in a solution. Hence there presented itself the problem of removing such colloids when they were present as impurities in already clarified sugar juice. Clarified juice was found to contain an appreciable quantity of such colloidal impurities that had not been, and apparently could not be, removed by conventional methods of juice clarification treatment. It appeared that the colloidal matter remaining in the juice added considerably to the losses in sugar, along with those losses caused by the dissolved impurities also left in the juice after clarification treatment.

In view of the ionic purification treatment herein proposed, this invention has also to do with beds that make use of granular ion exchange material that is of organic nature and is of that type now newly called organolites in distinction from the inorganic base exchangers heretofore known as zeolites. Organolites are being proposed currently, for instance, in sugar making, a use that will now be described as an example by which to convey an understanding of the ionic environment of this invention, and of the chemical exchange mechanism involved in the use of the exchangers. In extracting non-sugars and especially dissolved salts from sugar making juice or syrup, two main types of ion-exchange beds are used. One that is called the cation exchanger bed is characterized by its use of ionic exchanger material that operates on the hydrogen ion cycle and is adapted to collect from the juice positively charged ions (called cations) represented generally by calcium, magnesium, sodium and potassium. That is, as juice is supplied to the cation exchanger bed (or cell that contains the bed) so as to pass through it and out therefrom, cations of dissolved salts of the juice exchange themselves for hydrogen ions of the exchanger until the exchanger bed becomes depleted of its exchange capacity and is so saturated with cations that it ceases substantially to exercise further exchange activity. Thereupon the cation bed must be regenerated by contact with a regenerant in the form of an ionized strong acid such as hydrochloric or sulfuric acids. During regeneration, the reverse equilibrium process takes place in the exchanger, namely, the cation taken up by the exchanger exchange with hydrogen ions of the acid regenerant so that the cations flow from the bed until the bed is completely re-charged with hydrogen ions.

Juice that passes from the cation bed has had its impurity content of cations substantially removed and replaced by a molar equivalent of hydrogen ions, but it yet contains sulphates, chlorides and other such negative ionic impurities. So the juice substantially rid of its positive ionic or cation impurities that have been left behind, is contacted with an anion exchanger bed or cell that operates in the hydroxyl cycle. In passing through the anion bed, the negatively charged ions of the dissolved salts of the juice (called anions) are exchanged for the hydroxyl ions of the bed until the anion bed becomes saturated with sulphates, chlorides and the like anions. Thereupon the saturated anion bed must be regenerated by contact with some ionized alkali hydroxide or carbonate, especially sodium hydroxide or carbonate. During regeneration, the reverse equilibrium process takes place, namely, the residual chloride and sulphate anions in the bed exchange with hydroxyl ions of the basic regenerant so that the collected negative ions or anions flow from the bed until the anion bed is re-charged with hydroxyl ions. In passing through the anion bed, the juice is substantially rid of its negative or acid forming anions since they have been left in the exchanger. Thus, the basic or positive ions of the juice are removed from it while passing through a cation exchanger bed and the negative or acid forming ions are removed from it while passing through a subsequent anion exchanger bed. In other words, the cations of the salts are replaced by H-ions (in the hydrogen ion cycle) while the anions of the salts are replaced by OH-ions (in the hydroxyl ion cycle), with the net result that the salts are replaced with HOH (or $H_2O$), that is the molar equivalent in pure and evaporable water. Other substances are also removed from the juice by this particular treatment, that surprisingly are non-ionic, such as color imparting constituents and colloids.

These exchanger operating cycles can be described in chemical nomenclature, and for the sake of simplicity and illustration the removal of potassium chloride among other salts from the juice will be taken as an example. The organic resinous cation exchanger or organolite is assumed to have taken up H-ion in the course of its previous regeneration. Upon contacting the juice with the exchanger, the latter will exchange its H-ion for the potassium cation of the salt and form hydrochloric acid (HCl) according to the following equilibrium: Let X represent the organic structure or framework of the cation exchanger. Then:

(A) 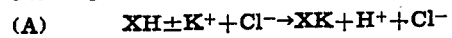

The juice according to Equation A is being acidified because of its reaction with the cation exchanger, since from the cation treatment it will have all or part of its anions converted to their corresponding acid, and so the chlorides, for instance, will have been converted to HCl.

After all or substantially all of the exchangeable H-ions have been replaced with potassium or other cations, for instance, Na, Ca, Mg, Fe, Al, as the case may be, from the juice, the exhausted exchanger is contacted with an acid solution of sufficient acidity, such as HCl, in which case the equilibrium condition is reversed as follows:

(B) 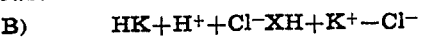

This represents that the exchanger is again ready for contacting with juice, while the potassium compound is available in the spent regeneration liquor and thus recoverable. Other acids, such as $H_2SO_4$, $HNO_3$, may be used instead of HCl for regeneration of the cation exchanger with corresponding results.

By contact of the juice with the organic resinous anion exchanger or organolite containing replaceable hydroxyl groups, the anion of the acid (HCl) present in the juice according to Equation A is taken up by the exchanger in exchange for the OH-group, and the following equilibrium established: Let Y represent the organic structure or framework of the anion exchanger. Then:

(C) 

According to Equation C the juice is being de-acidified as it is being freed from the acid that had previously formed in the cation exchanger according to Equation A.

In this way the cation as well as the anion of the salt constituting the impurity are removed from the juice and replaced with a molar equivalent of water.

When all the exchangeable hydroxyl (OH) groups have been replaced with Cl or other anions from the juice, for instance $SO_4$, $SO_2$, $NO_3$, the exhausted exchanger is contacted with an alkaline hydroxide or carbonate solution of sufficient alkalinity, such as NaOH, $Na_2CO_3$, KOH, $K_2CO_3$, $NH_4OH$, to reverse the equilibrium as follows:

(D) 

It will be understood that instead of HCl, another suitable strong acid, for instance $H_2SO_4$, may be used as a regenerant for the cation exchanger. In that instance sulfuric acid will reform as juice is being treated by the cation exchanger.

In the course of a complete operating cycle each of these exchangers, if exhausted, is to have the residual juice therein displaced from the exchanger bed with wash water, and if deposits have collected on the exchanger granules they are to be washed out, before the exchanger is subjected to contact with the regenerant solution. Again, if regeneration is completed, the residual regenerant is to be displaced and washed out from the exchanger with water, before the exchanger is again contacted with the juice. In this way undesirable reactions in the exchanger bed can be avoided and the exchanger be kept in regular cyclic operation with substantially undiminished efficiency.

The exhaustion or saturation of a fresh exchanger bed with the solution flowing downwardly therethrough proceeds in continuous fashion from the top to the bottom of the exchanger body. Hence, there exists, approximately speaking, a dividing line or relatively narrow zone of transition between the upper exhausted or saturated portion of the exchanger body and the lower non-exhausted or non-saturated portion of that body. This dividing line or zone keeps shifting downwardly through the exchanger body as the continuously through-flowing solution leaves an increasing exhausted exchanger portion behind as it advances through a correspondingly decreasing portion of non-exhausted or still active exchanger. However, as the dividing line is not necessarily a sharp one, there will be noticed a slowing down of the exchange intensity as the "break through" point of the exchanger is being approached. This is a warning that the fresh or regenerated exchanger should be substituted for the one nearing saturation. The regeneration of a bed proceeds in a similar manner through the bed.

One of a variety of organic cation exchangers considered suitable for the present purpose is of the resinous type such as exemplified in the U. S. patent to Holmes, No. 2,191,853, where the exchanger is described as a synthetic resin of the polyhydric phenol formaldehyde type which is sulphited to a degree such that its sulphur content is not less than 2.4%. An organic anion exchanger considered suitable for the present purpose is also of the resinous type and is exemplified in the U. S. patent to Adams and Holmes, No. 2,151,883, describing the exchanger as an insoluble resin-like product obtained by the reaction of formaldehyde with an aromatic amine. Exchangers of the type contemplated for use in connection with the present invention, are substantially stable in the presence of acids and alkalis.

The organic cation or base exchangers and organic acid or anion exchangers which may be used in this process include a variety of both.

Among the cation exchangers which may be used are:

1. Cation exchangers produced by the treatment of humic compounds with sulfur compounds which introduce acid sulfur groups into the humic substance so treated, such as treating lignite with concentrated sulfuric acid or equivalent. Materials of this class which have been stabilized by special treatment to prevent color throwing are also applicable.

2. Cation exchangers produced by treating materials containing aromatic phenols, such as tannins, with sulfuric acid, petroleum acid sludge, fuming sulfuric acid or equivalent agent which causes both the condensation of phenolic material and the introduction of acid sulfur groups to the condensed material.

3. Cation exchangers produced by the condensation of aromatic phenols with an aldehyde with or without the aid of catalysts.

4. Cation exchangers produced by the condensation of aromatic phenols with an aldehyde and with or without the aid of catalysts and into which acid sulfur groups have been introduced prior to, simultaneous with or subsequent to condensation.

5. The cation exchanger produced by the Resinous Products Co. of Philadelphia, under the name or identification of Amberlite IR.1.

A variety of organic anion exchangers which may be used comprises:

1. Anion exchangers produced by the condensation of an aromatic amine with an aldehyde.

2. Anion exchangers produced by the condensation of a mixture of an aromatic amine and a mono or disaccharide with an aldehyde.

3. Anion exchangers in which the active constituent is a basic dye stuff, such as the aniline blacks, which are insoluble in water and in aqueous acids and alkalis.

4. The anion exchanger produced by the Resinous Products Co. of Philadelphia, under the name or identification of Amberlite IR.4.

The invention as applied to the treatment of cane juice will now be described:

The character of cane juice differs from that of beet juice mainly by a high content in invert sugar (glucose), and also by a higher content in calcium compounds originally in the juice. Therefore, according to the usual practice, cane juice clarification differs from customary carbonation treatment of beet juice in that the cane juice is subjected to treatment involving mainly liming the juice in combination with heating to effect coagulation of the impurities thus coagulatable, and this is followed by separation of the resulting suspended solids. These treatment steps, in cane juice technology, are known as defecation, and according to current practice this is usually understood to convey that the liming of the cane juice is carried out by delicate pH control in a manner to leave the juice with a pH of the order from around 6.5 to around 8.6.

That is to say, because of the aforementioned characteristics of the cane juice, the usual clarification treatment or defecation treatment thereof, has imposed upon it certain limitations or compromises, in that the lime addition must be carefully controlled within narrow limits of the resultant hydrogen ion concentration in the juice, for the strongly alkaline lime is the cause of several detrimental effects in the further treatment of the juice. To be more specific, a resulting pH that is too high and in the alkaline range will cause undesirable chemical reactions between the calcium and the inverts that are plentiful in cane juice, whereas a pH that is too low will cause additional formation of inverts due to the acidity. The necessary compromise imposed upon this treatment is that the degree of liming should be kept low enough and to a practical minimum that is still compatible with the requirement of removing coagulatable solids from the juice, as well as with the requirement of minimizing the formation of undesired reaction products with the inverts. Hence delicate and critical control is necessary, and the degree of liming admissible lies normally substantially below that required for carbonation treatment of beet juice and even below that required for the aforementioned non-carbonation treatment of sugar juices proposed for the purpose of obtaining the coagulation of a maximum of suspended impurities.

The suspended solids are usually removed from the cane juice by a clarifier which may be followed by a filter to handle the clarifier sludge. Clarified juice and clear filtrate are then sent to evaporation without an attempt to reduce the alkalinity of the juice by intermediate treatment steps such as might correspond to carbonation and sulfitation steps customary in beet juice treatment.

In spite of this careful compromise in controlling the pH resulting from the defecation operation, there is encountered in the usual cane juice treatment a considerable degree of scaling in the evaporators due to calcium compound deposits therein, requiring frequent cleaning and overhauling of the evaporators. This is because the inorganic impurities present in the cane juice after defecation contain a larger proportion of calcium compounds than does clarified beet juice, which include the compounds of calcium with the inverts such as calcium gluconates. Calcium gluconates increase the viscosity of the mass in the vacuum pans and thereby retard and reduce the efficiency of crystallization and they are responsible for dark coloring of the juice. Consequently, a delicately balanced operating condition must be maintained at all times during the defecation operation, to the end of minimizing inversion as well as the formation of the scale producing and otherwise undesirable calcium compounds from whatever inverts are present in the cane juice, so that losses in sugar and in operating costs might be kept as low as is possible in view of these contradictory operating requirements.

Therefore, it is another object of this invention to produce a highly purified cane juice by effecting a maximum total removal of impurities therefrom without being subject to the limitations that control the practice of defecation customary in the treatment of cane juice.

According to this invention, it is through a novel manner of distributing the total solids removal burden with the aid of organolite treatment, that it is possible to avoid the limitations and compromises normally incumbent upon the defecation treatment of cane juice, and yet to attain an improved removal of the total impurities.

Accordingly, the juice may be limed in excess of the pH range normally considered permissible in customary defecation treatment, that is to say, without regard to delicate pH control, and solely with a view to a maximum removal of coagulatable solids. If the limed juice is subsequently treated by organolites, it is immaterial how great an amount of potentially scale forming and otherwise injurious calcium gluconates have previously been formed, inasmuch as these gluconates in passing through the organolite exchangers, are reverted to their original form of invert sugar (glucose), because of the absorption of the calcium ion of the gluconate by the cation exchanger. For instance, when liming up to about 10.0 pH, relatively better clarification results can be obtained without incurring the adverse conditions previously described.

Differentiating between beet juice and cane juice, it is to be recalled that heretofore the character of beet juice has required high liming and carbonation treatment as a result of which a reasonably white or refined sugar could be directly obtained from beet juice; whereas the particular character of cane juice has required low liming defecation treatment in which no carbonation was employed, and which resulted in a crystallized sugar of such color and impurities content that it required separate refining to produce white sugar.

The flowsheet shown in the drawing will serve in the interpretation of the improved process as regards both the treatment of beet juice as well as cane juice. This flowsheet shows a coagulation treatment phase herein also called the clarification or pre-treatment phase; an ionic exchange or organolite treatment phase for the correction of excess calcium content by means of sulfitation and/or $Na_2CO_3$ treatment. The clarification treatment comprises heating in combination with liming treatment of the juice, and separation of the thus coagulated matter from the juice. Different schools advocate different ways of how the liming and heating steps ought to be applied and conducted, some advocating to lime the juice before heating it, others to lime after heating, and still others to lime before and after heating.

The present flowsheet shows the raw juice 10 to enter a liming station 11 provided with an agitating means 11a where the partial requirement of lime 12 is added. The juice, after this partial liming under agitation passes to a heating station or heater 13, and from there on to another agitation liming station 14 having agitating means 14a where the balance 15 of the lime is added.

Heat, liming and agitation are employed in this treatment phase to coagulate, flocculate, precipitate, and decompose as much as possible of the non-sucrose impurities. Part of the lime goes into solution in the sugar juice and reacts with some of the impurities present therein. It combines with any free acid present such as organic acids, and it displaces potassium and sodium from the alkali salts of those acids whose lime salts are insoluble. Oxalic and phosphoric acids, and their alkali salts, are typical of this class of compounds which are removed from solutions by lime. Coagulation of organic impurities such as albumin is also effected by the heating and liming thereof. This treatment phase effects coagulation of a quantity of coagulatable material, and flocculation of a quantity of suspended material.

An economical as well as effective optimum might be considered to correspond to an induced pH of about 10.0. That is to say, with such a pH value there may be obtained an effective removal of coagulatable impurities at a relative minimum of expenditure in CaO, which removal may or may not include the coagulation of colloidal impurities in the juice. At any rate, this coagulation or clarification treatment may be conducted in a manner to obtain a desired optimum degree of coagulation economically, without regard as to whether or not colloidal matter is also being removed by such coagulation, since, according to the treatment method of this invention, it may be preferable to impose the colloid removal burden and possibly also the removal of coloring constituents in the juice upon the ionic exchange treatment phase that follows:

The coagulated impurities are removed from the juice in a separating stage in which any of the suitable or customary means of separation may be employed, and which may comprise, for instance, sedimentation or filtration or centrifuging, or a combination of any of them. The separation stage is herein shown to comprise a multiple tray Dorr clarifier 17 incidentally having in it a flocculation compartment into which the juice initially enters, and of the type now frequently used in the clarification of sugar juice. The limed juice enters the clarifier 17 by way of the line 16 and clarified juice overflows at 18 from the clarifier. Settled solids in the form of sludge leave the bottom of the clarifier at 19 to enter a filter 20 where clear juice is recovered from the sludge and returned along the line 21 to the inlet end of the clarifier where it may mix with the feed juice to the clarifier. Filter cake 22 discharges from the filter 20.

The clarified juice as a result of the desired effective coagulation and clarification performed thereon by the type of pretreatment chosen has in it an excess of scale forming calcium compound that must be removed as a matter of saving crystallizable sugar, as well as protecting the evaporators against undue scaling, and otherwise reducing operating costs such as the cost of evaporation and crystallization. It is desirable that excess calcium thus introduced be removed from the juice by subtraction. The term "subtraction" is herein meant to convey that the respective impurity or impurities are removed in a manner whereby substitution of one impurity for another is substantially avoided.

It will be recalled that, due to the exchange mechanism involved, the juice will become acidified while passing through the cation exchanger, and subsequently again become de-acidified while passing through the anion exchanger. It is also remembered that in a juice that is acid the sucrose is more readily subject to inversion at higher temperatures than at lower temperatures. By cooling the juice prior to its entry into the exchangers, inversion on that account can be largely reduced.

Cooling of the pre-treated juice, however, may cause the precipitation therein of impurities normally not precipitable at the higher temperatures usually prevailing in the juice. Therefore, my co-pending application discloses a filtering station in which such precipitate can be removed from the juice before allowing it to pass on to the exchangers.

Therefore, what I have designated as the ionic exchange treatment in the present flowsheet, comprises a cooling station 25 receiving clarified juice through the line 24. Consequently, any precipitate appearing as a result of the cooling may be intercepted by a filter station 26, before the juice is allowed to pass on into a battery 27 of ionic exchangers where the subtraction of ionic impurities and also the removal of colloids as well as of color constituents may be effected. This exchanger battery 27 here shown in its simplest form comprises a cation exchanger bed 28 and an anion exchanger bed 29 in series therewith. Each exchanger bed in fact is represented by a cell containing granular exchanger material. The impurities subtracted from the juice by treating it with the exchangers are subsequently found in the regenerant liquor during the regenerating phase of the exchangers, and as such are shown to leave the exchanger battery at 30.

The juice leaving the exchanger station is highly purified in that it will have had subtracted from it a total of impurities, coagulatable, ionic, colloidal, and color constituents, in a novel manner which I consider simple, economical, highly effective, and relatively simple in equipment and operation. This highly purified beet juice may then be treated in an evaporator station 31 with a minimum of scaling therein, and in a crystallizer station 32, all at a minimum of expenditure and losses. The final residue 33 leaving the crystallizer station in the form of molasses will consequently also have become a minimum as a result of the total removal of impurities according to this method. Consequently, there is a maximum yield of crystallized sugar 34 from the crystallization station 32.

In practicing the treatment of cane juice on the basis of the present flowsheet, it will be seen that the principal treatment phases, namely coagulation and ionic exchange, apply the same as in the instance of beet juice, although the type of impurities removal burden imposed upon them differs because of the different character of cane juice as compared with beet juice impurities. The steps of the intermediate treatment, that is, sulfitation and/or $Na_2CO_3$ treatment, may also be applied if desired. But the net result is a cane juice that is highly purified with respect to coagulatable and non-coagulatable impurities as well. It is largely free from scale-producing compounds which are a main problem with cane juice, and constitute the main reason for the practicing of the conventional low liming or defecation treatment which, for the reasons previously explained, might well be called a compromise treatment. With the present improved method no such compromise is necessary, for the rate of liming can be increased in disregard of the liming considerations that underlie the defecation method. The benefit of a maximum removal of the coagulatable impurities may thus be had at the price of a relatively small absolute increase in lime addition. If an induced pH of 10.0 in the clarified cane juice is assumed to be in keeping with the clarification requirements, as compared with an average pH of 8.0 as maintained in defecation practice, this would correspond to an increase in lime consumption to about 1½ to 2 pounds of CaO (for 10.0 pH), from ¾ pounds of CaO (for 8.0 pH), per ton of cane. Thus, the object of subtracting from cane juice effectively a maximum of total impurities is attained by a reasonably small increase in the liming rate.

In treating cane juice according to the invention, the formation of the otherwise undesired calcium gluconates by excess liming need not be feared, since the calcium ion is absorbed and subtracted from the juice by the subsequent exchange treatment where the gluconates are being reconstructed to their original form of invert sugar (glucose).

I claim:

A process for the removal of impurities from cane sugar juice, which comprises heating and liming the juice with calcium compound to a pH in excess of 8.6 and not in excess of the order of 10.0 to effect coagulation of solid phase impurities in the juice, separating the coagulated matter to obtain a juice that is clarified but which contains dissolved impurities including excess calcium compound at least partially as calcium-glucose compound formed by excess Ca reacting with glucose in the cane juice and thereby forming calcium glucose compounds, and subjecting the thus clarified juice to sequential treatment in a bed of cation exchanging material operating in the hydrogen ion cycle and in a bed of anion exchanging acid adsorption material operating in the hydroxyl cycle to effect substantial elimination of dissolved impurities including calcium introduced by the liming while re-constituting glucose as such from said calcium-glucose compounds.

FRANK NATHAN RAWLINGS.